Sept. 29, 1925.
1,555,413
O. R. GRÖNKWIST
APPARATUS FOR AUTOMATIC MEASUREMENT OF THE RATIO
BETWEEN THE MOVEMENTS OF TWO MEMBERS
Filed Jan. 16, 1922
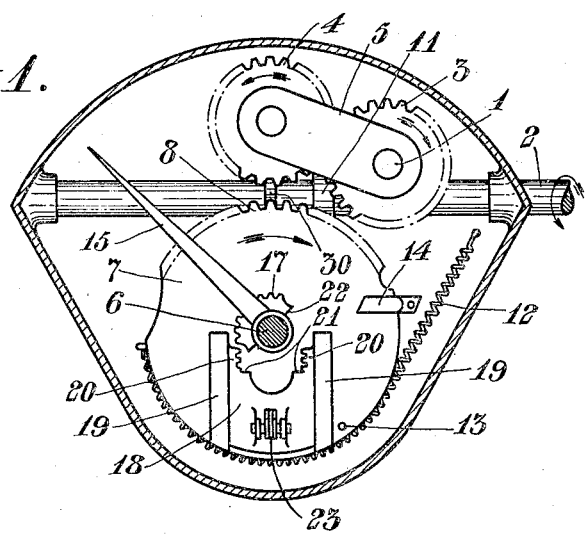
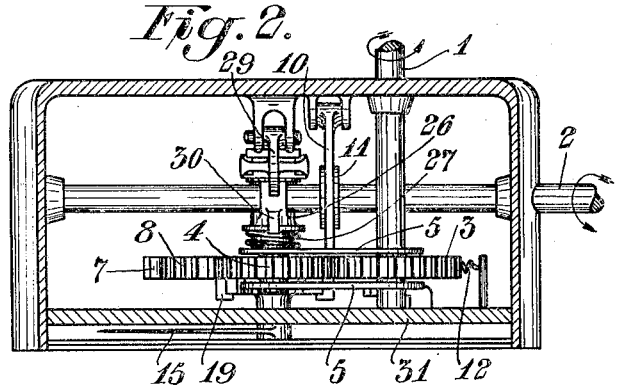
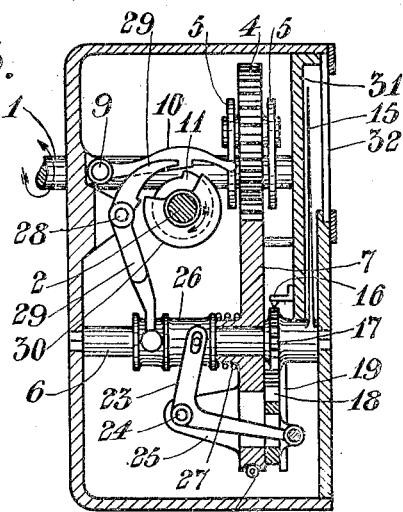
Inventor:
Oscar Robert Grönkwist
By George Bayard Jones Atty.

Patented Sept. 29, 1925.

1,555,413

UNITED STATES PATENT OFFICE.

OSCAR ROBERT GRÖNKWIST, OF STOCKHOLM, SWEDEN.

APPARATUS FOR AUTOMATIC MEASUREMENT OF THE RATIO BETWEEN THE MOVEMENTS OF TWO MEMBERS.

Application filed January 16, 1922. Serial No. 529,668.

*To all whom it may concern:*

Be it known that I, OSCAR ROBERT GRÖNKWIST, a subject of the King of Sweden, residing at Stockholm, in the Kingdom of Sweden, have invented a new and useful Improvement in Apparatus for Automatic Measurement of the Ratio Between the Movements of Two Members, of which the following is a specification.

The present invention relates to an apparatus for automatic measurement of the ratio or quotient between the movements of two members, usually rotating members, both of which move with variable speeds. The object of the invention is to provide a simple and reliable measuring apparatus of this kind by means of which it will be possible to measure the consumption of energy of the engine or motor of a vehicle, for instance an automobile, a steam locomotive, an electric motor car, or a vessel, per unit of distance travelled, or vice versa.

The present measuring apparatus is broadly characterized by a movable measuring element capable of being connected to one of the members by means of a coupling, so that said element may thus be caused to move with a speed proportional to the speed of said member, said coupling being connected and disconnected by the second member at suitable intervals of time which are dependent upon the speed of the last-mentioned member. The measuring element may suitably actuate a pointer movable independently of the same, or another suitable indicating device, in such manner that at each connection of the measuring element to the one movable member the pointer is set in a position which is dependent upon the movement performed by the measuring element from the moment of connection to the following disconnection. Said pointer will then indicate the ratio between the movements of the two members.

In the accompanying drawing an embodiment of a measuring apparatus according to the invention is shown by way of example. Fig. 1 shows a front elevation of the apparatus, the front portion of the casing being cut away. Fig. 2 is a horizontal section, and Fig. 3 is a vertical section of the apparatus.

The measuring apparatus illustrated is intended for measuring for instance the fuel consumption of the engine of an automobile or other vehicle per kilometer travelled. It is assumed that the shaft 1 is connected with a liquid fuel meter of any suitable type—for instance that described and claimed in applicant's copending application Serial No. 529,667 through which meter the fuel passes on its way to the engine, whereas the shaft 2 is connected by means of any suitable gearing with the wheels of the automobile so that said shaft rotates in the direction indicated by the arrows in the drawing. Both shafts will of course rotate with varying speeds, the speed of the shaft 1 being increased with an increased consumption of fuel, and the speed of the shaft 2 varying with the number of revolutions of the wheels, that is to say with the speed of the automobile.

A toothed gear wheel 3 is secured to the shaft 1, said wheel 3 being always in engagement with a second toothed gear wheel 4 journaled in two arms 5 capable of turning on the shaft 1. In the embodiment illustrated the measuring element consists of a disk 7 capable of turning on a fixed shaft 6, said disk 7 being provided on a portion of its circumference with teeth 8 with which the gear wheel 4 may be caused to engage when the arms 5 are swung downwards from the position shown in Fig. 1. In the instance illustrated, the gear wheel 4 thus constitutes the coupling member by means of which the measuring element 7 may be connected to the shaft 1. In the positions of the parts illustrated in Fig. 1, the gear wheel 4 is maintained in raised position out of engagement with the teeth on the disk 7, by a lever 10 turning on the fixed pivot 9, the free end of said lever 10 engaging the lower edge of one of the arms 5. Said lever 10 is actuated by a cam disk 11 secured to the shaft 2, and is provided on its under side with a lug. When during the rotation of the shaft 2 in the direction indicated by the arrow in Fig. 3, said lug drops into the recess in the cam disk 11, the gear wheel 4 is lowered into engagement with the teeth on the disk 7 so that thus said disk is coupled to the shaft 1 and is rotated in clock-wise direction, as indicated by the arrow in Fig. 1. The disk 7 is actuated by a spring 12 tending to rotate the disk in the opposite direction, and when the gear wheel 4 is again raised out of engagement with the disk, said spring 12 returns the disk to its initial position which is determined by a pin 13 secured to the disk striking against a fixed stop 14, Fig. 1.

A pointer 15 is also provided on the shaft 6 said pointer being capable of rotating independently of the disk 7 and being normally maintained in set position by a spring pawl 16 catching in a toothed segment 17 on the hub of the pointer. The pointer is actuated by the disk 7 by the intermediary of a slide 18 which is movable in the radial direction of the disk in two guides 19 secured to said disk. The slide is provided with two opposing tooth racks 20 adapted to cooperate with the toothed segment 17 of the pointer, and with two abutments 21 lying in the same plane and adapted to be brought to bear against two corresponding plane surfaces 22 on the toothed segment. The movement of the slide 18 is effected by means of a bell crank lever 23 turning on a pivot 24 secured in lugs 25 on the rear side of the disk 7. One arm of said lever 23 projects through an aperture in the disk 7 and is connected with the slide 18, the other arm of said lever being connected with a sleeve 26 turning with the disk 7 and sliding on the shaft 6. Said sleeve 26 is actuated by a spring 27 tending to move said sleeve to the left in Fig. 3, and by a lever 29 turning on the fixed pivot 28, said lever 29 being actuated by a second cam disk 30 secured to the shaft 2.

The pointer moves over a scale on a partition 31 in the casing of the apparatus, and is protected by a glass pane 32. In order to prevent the disk 7 from turning through a greater angle than that permitted by the measuring range of the scale, said disk 7 is provided with teeth 8 only on a portion of its circumference so that it can only be turned through a predetermined maximum angle.

The measuring apparatus described operates in the following manner: In the positions of the parts shown in the drawing, the gear wheel 4 is maintained in raised position out of engagement with the teeth 8 on the measuring disk 7, which is thus disconnected from the shaft 1 and is assumed to be in the act of turning in counter-clockwise direction, as seen in Fig. 1, under the action of the spring 12, until the pin 13 strikes against the fixed stop 14. The pointer 15 does not take part in this return movement of the measuring disk, owing to the slide 18 being retracted out of engagement with the toothed segment 17 of the pointer in view of the spring 27 being compressed by the lever 29 which bears and slides against the concentric portion of the circumference of the cam disk 30. The pointer 15 is therefore maintained by the pawl 16 in the position in which it was set during the measuring period immediately preceding. Shortly after the measuring disk 7 having in this manner been returned to its initial position, the lug on the lever 10 drops into the recess in the cam disk 11 rotating with the shaft 2, so that the gear wheel 4 is lowered into engagement with the teeth 8 on the measuring disk 7, said disk being thus coupled to the shaft 1. This moment marks the beginning of a period of coupling and also of a measuring period.

The measuring disk 7 now begins to rotate in clockwise direction, as seen in Fig. 1, with a speed proportional to the speed of the shaft 1, that is to say to the fuel consumption. At first the pointer 15 does not take part in the said movement, however, but is maintained in its position by the pawl 16, owing to the spring 27 being still compressed by the lever 29. Only when the cam disk 30, which also rotates with the shaft 2, has rotated through such an angle, almost a full rotation, from the position shown in Fig. 3, that the two lugs on the lever 29 may drop into the recess in the cam disk 30, the spring 27 will move the sleeve 26 to the left in Fig. 3, whereby the slide 18 actuated by the bell crank lever 23 is moved towards the center of the measuring disk 7. In accordance with the relative positions of the measuring disk and the pointer the one or the other of the toothed racks 20 on the slide will thus engage the toothed segment 17 of the pointer, and will turn said pointer, until the pointer is parallel with the direction of sliding movement of the slide 18, and the abutments 21 on the slide bear against the plane bearing surfaces 22 on the toothed segment. If for instance the slide 18 is moved upwards in the position of the measuring disk indicated in Fig. 1, the left hand toothed rack 20 will thus engage the toothed segment 17 and turn the pointer to vertical position. By this movement of the slide 18 the pointer 17 is thus set to agree with the angle through which the measuring disk 7 has travelled from the initial position, and is coupled to the measuring disk.

The pointer 15 now takes part during a moment in the movement of the measuring disk 7, until on the continued turning of the cam disk 30 said disk 30 returns the lever 29 to the position shown in Fig. 3, and by the intermediary of the sleeve 26 and the bell crank lever 23, retracts the slide 18 from the toothed segment 17 of the pointer. The pointer will thus stop at the moment when the lowermost lug on the lever 29 again moves up on the concentric portion of the circumference of the cam disk 30. This moment marks the end of the measuring period. The rotation of the measuring disk 7, i. e. the period of coupling continues during a moment more, however, until shortly afterwards, by means of the lever 10, the cam disk 11 raises the gear wheel 4 up from engagement with the teeth of the measuring disk. As soon as the measuring disk has become disconnected from the shaft 1 in this manner, the disk immediately begins to return to the initial position under the influence of the spring 12 which has become stretched in the meantime, whereupon the course described repeats itself.

By the measuring period ending a moment before the period of coupling, as above described, that is to say by the pointer 15 being disconnected from the measuring disk 7 a moment before said disk is disconnected from the shaft 1 and begins its return movement, it is assured that the pointer actually stops in the adjusted position and does not receive an impulse in the opposite direction when the measuring disk reverses its movement. Both cam disks 11 and 30 being secured to the shaft 2, however, the angle through which the shaft 2 turns during the interval between the end of the measuring period and the end of the period of coupling, is always constant. As mentioned above, the pointer is coupled to the measuring disk towards the end of the measuring period only, and is then rapidly set in accordance with the angle through which the measuring disk has travelled from the initial position. The pointer 15 will thus remain stationary during the greater part of the measuring period which will facilitate reading of the indications.

The beginning and the end of the measuring period being determined by the cam disks 11 and 30, both of which are secured to the shaft 2 driven by the wheels of the automobile or car, the measuring period will correspond to a certain number of turns of the wheel, that is to say, a certain distance travelled. The angle through which the measuring disk 7 is turned from the initial position during said measuring period, corresponds to a certain number of turns of the shaft 1, that is to say, a certain consumption of fuel, and the pointer 15 being during each period set in a position which is dependent upon the rotation of the measuring disk during the period in question, it will be evident that the pointer will indicate the absolute fuel consumption during the measuring period and, assuming a suitable selection of the scale, the consumption per unit of distance travelled, or inversely, the distance travelled per unit quantity of fuel consumed.

The present measuring apparatus being totally independent of the amount of friction arising in the various gearing, and indicating only a single average value for each measuring period, it is particularly well adapted to be combined with a device for registering the measuring results. If in the apparatus above described for measuring the specific fuel consumption of an automobile engine, a pen-point is connected with the pointer 15 and a paper strip is run below said pen point, the specific fuel consumption may be directly recorded by means of such arrangement. In this instance the recording device becomes particularly simple on account of the paper strip not having to be driven by a clock-work, as is usually the case, but need only be fed a small distance, for instance one millimeter or a few millimeters, for each measuring period, so that a short strip of paper is sufficient for a considerable distance of travel. Again, if the paper strip be driven by means of a clock-work so that it runs below the pen-point with a uniform speed, not only a register of the specific fuel consumption but also a register of the speed of the automobile is obtained through the length of the various measuring periods.

The embodiment above described may of course be modified in several respects without departing from the principle of the invention. It is for instance possible to connect the shaft 1 with the wheels of the automobile, and the shaft 2 with the fuel meter, without the operation of the apparatus becoming changed. Finally, in the case of measuring the fuel consumption of a marine engine per unit of distance traveled, or vice versa, one of the shafts, 1 or 2, may be connected with a log so as to be driven with a speed proportional to that of the vessel, the other shaft, 2 or 1, being driven by a fuel meter which measures the fuel consumption of the engine.

I claim:

1. In an apparatus for automatic measurement of the ratio between the movements of two members moving with variable speeds, the combination of a movable measuring element, a coupling for connecting said element with one of said members, means for operating said coupling by the second member, and a pointer movable independently of said measuring element, said measuring element being adapted to actuate said pointer in such manner that on every connection of the measuring element to said first member said pointer is set in a position which is dependent upon the movement performed by the measuring element from the connection to the subsequent disconnection.

2. In an apparatus for automatic measurement of the ratio between the movements of two members moving with variable speeds, the combination of a movable measuring element, a coupling for connecting said element with one of said members, means for operating said coupling by the second member, a pointer movable independently of said measuring element, and means for connecting said measuring element to said pointer, said last mentioned means being actuated by said second member which effects connection and disconnection of said coupling between the first member and the measuring element, in such manner that the pointer is at rest during the greater portion of the periods of coupling of the measuring element and is set in a position corresponding to the last movement of the measuring element only towards the end of each period.

3. In an apparatus for automatic measurement of the ratio between the consumption of energy of an engine of a vehicle and the distance travelled, the combination of a gear driven with a speed proportional to the speed of an energy meter measuring the consumption of energy of the engine, a shaft driven with a speed proportional to the speed of the vehicle, a rotatable measuring element having a toothed arc, a coupling gear between said first-mentioned gear and said toothed arc and adapted to move into and out of engagement with the latter, a cam on said shaft adapted to actuate said coupling gear to move it into and out of engagement with said toothed arc on said measuring element, means adapted to return said measuring element to its initial position after every disconnection of said coupling gear from said toothed arc, a rotatable pointer, means connected with said measuring element for actuating said pointer and adjusting it in a position corresponding to the position of said element, and a cam on said shaft adapted to actuate said last-mentioned means immediately before said first-mentioned cam on said shaft effects the disconnection of said coupling gear from said toothed arc.

4. In a device of the class described, a pair of members driven with variable speeds, a measuring element, a coupling device driven by one of said members and movable into and out of engagement with said measuring element by the other of said members, a pointer, and means movable radially of said measuring element adapted to move said pointer to a position corresponding to a prior independent movement of said measuring element.

5. In a device of the class described, a measuring element driven with a variable speed, a pointer, a member movable radially of said element and adapted to move said pointer to a position corresponding to a prior movement of said measuring element, and means for returning said member to initial position relatively to said measuring element, said means being controlled by a member driven with a variable speed.

6. The combination with a shaft driven at a speed proportional to the speed of a vehicle, of a second shaft driven with a speed proportional to the rate of fuel consumption of said vehicle, a coupling driven by said second shaft, a measuring element adapted to be driven by said coupling, a cam on said first shaft adapted to disconnect said coupling from said measuring element at predetermined distances of travel of the vehicle, a pointer, and means carried by said measuring element for setting said pointer in indicating position corresponding to a prior movement of said measuring element.

7. The combination with a shaft driven at a speed proportional to the speed of a vehicle, of a second shaft driven with a speed proportional to the rate of fuel consumption of said vehicle, a coupling driven by said second shaft, a measuring element adapted to be driven by said coupling, a cam on said first shaft adapted to disconnect said coupling from said measuring element at pre-determined distances of travel of the vehicle, a pointer, and means carried by said measuring element for setting said pointer in indicating position corresponding to a prior movement of said measuring element, the actuation of said means being controlled by a second cam carried on said first shaft.

8. The combination with a shaft driven with a speed proportional to the speed of a vehicle, of a second shaft driven with a speed proportional to the rate of fuel consumption of said vehicle, a measuring element, a coupling driven by said second shaft and adapted to drive said measuring element, a pointer, a slide carried by said measuring element adapted to set said pointer in position corresponding to a prior movement of said measuring element, a cam on said first shaft for disconnecting said coupling from said measuring element, and means controlled by said first shaft for actuating said slide just prior to the disconnection of said coupling.

OSCAR ROBERT GRÖNKWIST.